United States Patent
Lopez et al.

[19]

[11] Patent Number: 6,148,117
[45] Date of Patent: *Nov. 14, 2000

[54] IMAGE PROCESSING SYSTEM WITH ALTERABLE LOCAL CONVOLUTION KERNEL

[75] Inventors: Patricia D. Lopez, Loveland; Dan S. Johnson; Nancy K. Mundelius, both of Greeley, all of Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/775,061

[22] Filed: Dec. 27, 1996

[51] Int. Cl.$^7$ .................................................. G06K 15/316
[52] U.S. Cl. ........................... 382/279; 382/263; 382/264
[58] Field of Search .................................... 382/279, 263, 382/264

[56] References Cited

U.S. PATENT DOCUMENTS

| | | | |
|---|---|---|---|
| 4,330,833 | 5/1982 | Pratt et al. | 364/515 |
| 4,937,774 | 6/1990 | Malinowski | 364/724.12 |
| 4,955,024 | 9/1990 | Pfeiffer et al. | 371/38 |
| 4,969,043 | 11/1990 | Pothier | 358/209 |
| 5,131,057 | 7/1992 | Walowit et al. | 382/41 |
| 5,299,029 | 3/1994 | Moriya et al. | 358/447 |
| 5,363,213 | 11/1994 | Coward et al. | 358/455 |

FOREIGN PATENT DOCUMENTS

0407213 A2  1/1991  European Pat. Off. ............... 15/62

*Primary Examiner*—Matthew C. Bella
*Assistant Examiner*—Sheela Chawan
*Attorney, Agent, or Firm*—Augustus W. Winfield

[57] ABSTRACT

A method for image processing combining a device-specific image processing kernel operation with a general image processing kernel operation. Device specific parameters are sent from a host computer to an imaging device. The imaging device selects appropriate device-specific convolution coefficients. The host computer selects additional kernel operations. In a first example embodiment, the device-specific coefficients are then uploaded to the host computer and the host computer convolves the host-specified operations with the device-specific operations. The combined kernel is then downloaded to the imaging device. In an alternative embodiment, the host-specified operations are downloaded to the imaging device for combining. The combined kernels are then used by the imaging device for convolution operations on an image. As a result, host computer software can modify a kernel operation within an imaging device with minimal knowledge of device-specific parameters such as native resolution.

6 Claims, 3 Drawing Sheets

IMAGE PROCESSING SYSTEM WITH ALTERABLE LOCAL CONVOLUTION KERNEL

FIELD OF INVENTION

This invention relates generally to computerized image processing and more specifically to an system in which an imaging device includes programmable convolution hardware and in which convolution kernel values local to the imaging device are modified in response to options selected by a host computer operator.

BACKGROUND OF THE INVENTION

Digital cameras, image scanners, copiers, facsimile machines and other electronic imaging devices provide images in an electronic form suitable for transmission, printing or storage. Picture elements (pixels) are represented numerically as intensity values or coordinates in a color space. Once images are acquired in computer readable form, they may be "processed" to remove distortions, to reduce noise, to modify color, to accentuate outlines, and so forth. This patent document is concerned with image processing, and in particular, spatial filters, also called kernel operations or convolution kernels.

Photosensor arrays used in imaging devices typically have thousands of individual photosensitive elements. Each photosensitive element, in conjunction with optics assemblies, measures light intensity from an effective area defining a pixel on the image being scanned. The resolution defined by the optics and the individual photosensitive elements is called the "native" resolution. Additional pixels may be inserted by interpolation or padding, creating a higher "effective" resolution. Lower resolutions than the effective resolution may then be obtained by dropping selected pixels, called decimation.

Images have spatial frequency information. For example, patterns of dots in half-tone printed images have a spatial frequency. Periodic sampling of spatial patterns may produce aliasing if the spatial sampling frequency is less than twice the highest spatial frequency in the image being sampled. In particular, decimation to provide a lower resolution may introducing aliasing artifacts if the digitized image is not appropriately filtered. Therefore, images may need to be spatially low-pass filtered before decimation is performed.

Another common image processing filter of interest is spatial high-pass filtering, and in particular Laplacian operators. Visually, Laplacian operators improve image contrast at edges, making edges easier for the viewer to see, making an image appear sharper.

Both spatial low pass filtering and spatial high pass filtering may be computed by spatial convolution, in which a pixel value and its surrounding neighboring pixel values are multiplied by coefficients, the results summed, and the resulting value replacing the original pixel value. Convolution in the spatial domain is mathematically equivalent to multiplication in the frequency domain and linear filtering can be implemented in either domain.

For a general tutorial overview of image processing, see, for example, Ross, John C., *The Image Processing Handbook,* 2nd Edition (1995), CRC Press, Inc. Low pass spatial filtering is discussed in Ross at pages 155–164. Laplacian operators are discussed in Ross at pages 225–232.

Electronic imaging devices are often connected to a host computer. The host computer may include control software for the imaging device, enabling a computer operator to change parameters within the imaging device. In general, for computer control of peripheral devices, it is often preferable for host software to be device-independent. That is, host software should not have to be concerned with specific hardware specifications in a peripheral device. There is a need for an imaging system in which device-specific operations can be performed within an imaging device, transparent to the host computer, and in which a host computer operator can specify some control in a device-independent manner.

SUMMARY OF THE INVENTION

An electronic imaging device includes a programmable convolution kernel with hardware computation within the imaging device. Given a resolution specified by a host computer, the imaging device interpolates or pads between native pixels to provide pixels at a higher effective resolution, and then low-pass filters the higher resolution image and decimates to provide the specified resolution. The imaging device selects filter coefficients appropriate for the device-specific native resolution and the effective resolution. In addition, an operator can specify image sharpening or other spatial filtering. The host-specified Laplacian kernel (or other spatial filter) is then convolved with the device-specific convolution kernel, with appropriate modification for decimation. In one example embodiment, the host computer uploads the device-dependent convolution kernel from the imaging device, convolves a host-specified Laplacian kernel with the uploaded convolution kernel, and downloads the resulting modified convolution kernel to the imaging device. In an alternative example embodiment, the host-specified Laplacian kernel is downloaded to the peripheral imaging device and the imaging device convolves the two kernels. In either embodiment, after combining kernels, the imaging device then computes combined device-dependent and host-specified spatial filtering, with the host required to have only minimal knowledge of native resolution or other device specific parameters.

DETAILED DESCRIPTION OF THE PREFERRED EMBODIMENT OF THE INVENTION

Figure 1A:
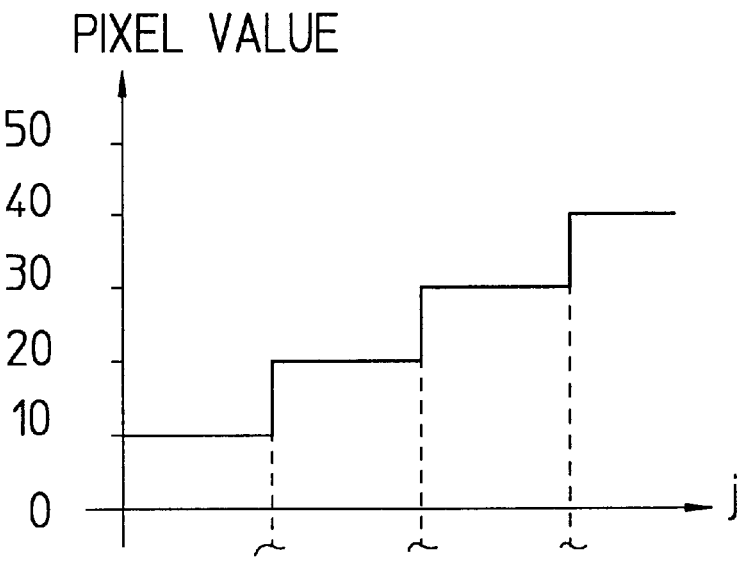
FIG. 1A is a plot of pixel (intensity) values as a function of column number for one row of an example image.

The following array of numbers represents pixel values $P(i,j)$ in a two dimensional image. Assume for illustration that pixels having low numerical values are dark and pixels having high numerical values are light. FIG. 1A is a graph of row number 2 ($i=2$) as a function of column number (j).

```
i = 1   10 10 10 10 ▓ 20 20 20 30 30 30 30 40 40 40
i = 2   10 10 10 ▓▓▓▓ 20 20 30 30 30 30 40 40 40
i = 3   10 10 10 10 ▓ 20 20 20 30 30 30 30 40 40 40
j =      1  2  3  4  5  6  7  8  9 10 11 12 13 14 15
```

The present patent document is concerned with spatial filtering using convolution. The following example illustrates a convolution kernel.

```
            W(i−1, j)
W(i, j−1)   W(i, j)    W(i, j+1)
            W(i+1, j)
```

For each pixel P(i,j), the convolution computation is as follows:

$P(i,j)=[W(i,j)*P(i,j)+W(i+1,j)*P(i+1,j)+W(i,j−1)*P(i,j−1)$
$+W(i,j+1)*P(i,j+1)+W(i−1,j)*P(i−1,j)]/$
$[W(i,j)+W(i+1,j)+W(i,j−1)+W(i,j+1)+W(i−1,j)]$

Convolution operations are destructive, so a copy of each original numerical pixel value must be stored long enough to ensure that the computation is performed on original pixel values, not modified pixel values. In addition, special rules are required for the outer edges of the image, by creating artificial boundaries or by choosing to not perform the filtering operation for pixels adjacent to a boundary. In general, convolution kernels are a matrix of coefficients. In the above example, the matrix is 3×3 with the corner coefficients having a value of zero. Much larger matrices may be used.

Consider the following convolution kernel which is an example of a spatial low-pass filter:

```
      1
   1  2  1
      1
```

For each pixel P(i,j), the computation is as follows:

$P(i,j)=[2*P(i,j)+P(i+1,j)+P(i,j−1)+P(i,j+1)+P(i−1,j)]/6$

For example, consider P(2,5) highlighted above.

$P(2, 5) = [2 * P(2, 5) + P(1, 5) + P(2, 4) + P(2, 6) + P(3, 5)]/6$ $= [40 + 20 + 10 + 20 + 20]/6 = 18.3$

As a result of applying the convolution operation, the value of P(2,5) is changed from 20 to 18.3. The following numbers (rounded to integers) represent row 2 above after application of the above spatial low-pass filter (edge pixels are not filtered).

```
i = 2   10   10 10 12 18   20 20 22 28   30 30 32 38   40 40
j =      1    2  3  4  5    6  7  8  9   10 11 12 13   14 15
```

Figure 1B:
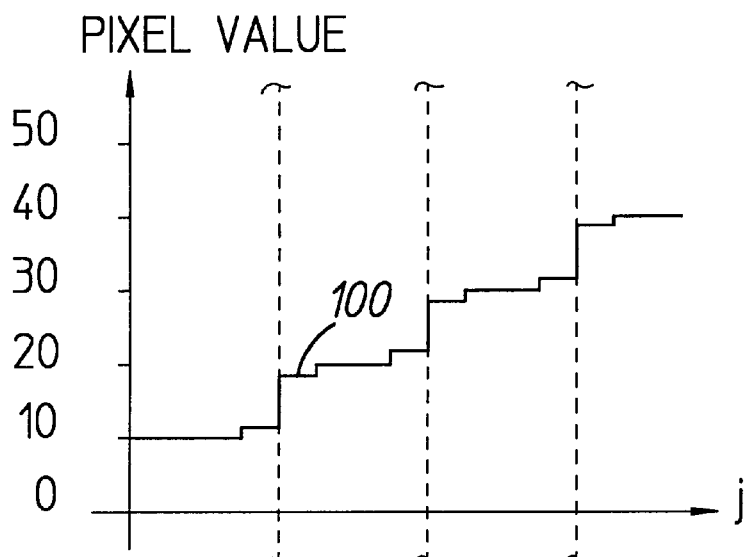
FIG. 1B is a plot of the pixel values of FIG. 1A after being modified by a spatial low-pass filter.

FIG. 1B illustrates the above filtered row. Reference number 100 in FIG. 1B designates P(2,5) used for the above numerical example. Note that the abrupt steps in intensity now have a slight spatial transition.

Now consider the following convolution kernel, which is an example of a Laplacian operator, a spatial high-pass filter:

```
        −1
   −1    6   −1
        −1
```

For each pixel P(i,j), the computation is as follows:

$P(i,j)=[(6)*P(i,j)−P(i+1,j)−P(i,j−1)−P(i,j+1)−P(i−1,j)]/2$

The following numbers (rounded to integers) represent original row 2 after application of the above Laplacian operator (the edge pixels are not filtered).

```
i = 2   10   10 10  5 25   20 20 15 35   30 30 25 45   40 40
j =      1    2  3  4  5    6  7  8  9   10 11 12 13   14 15
```

Figure 1C:
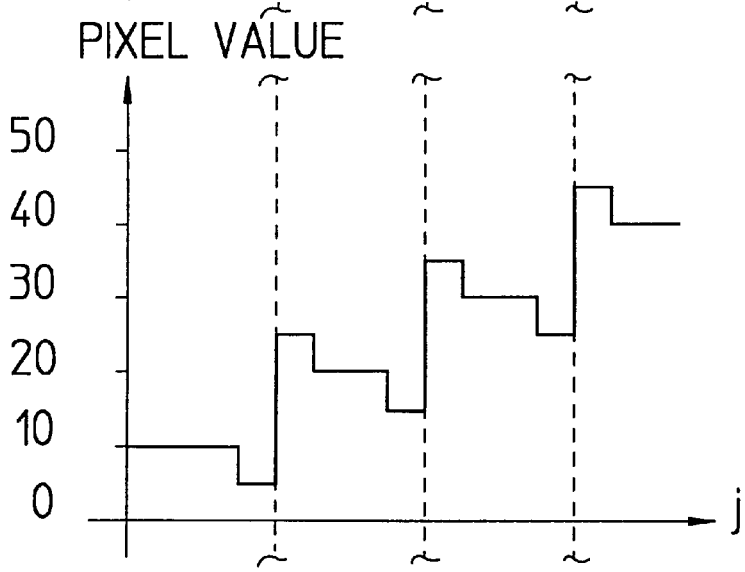
FIG. 1C is a plot of the pixel values of FIG. 1A after being modified by a spatial high-pass filter.

FIG. 1C is a graph of original row number 2 above after application of the above Laplacian operator. Note that steps in intensity in the original image (FIG. 1A) result in an undershoot followed by an overshoot in the filtered image (FIG. 1C). As a result, steps in intensity having an increment of 10 in FIG. 1A have an increment of 20 in FIG. 1C. That is, intensity steps or edges or boundaries are exaggerated. The above filters are used for illustration only. In an actual implementation, the cut-off spatial frequencies of the low-pass filter and the sharpening filter must be consistent. That is, the sharpening filter should exaggerate spatial frequencies that are just below the cut-off frequency for the low-pass filter.

Figure 2:
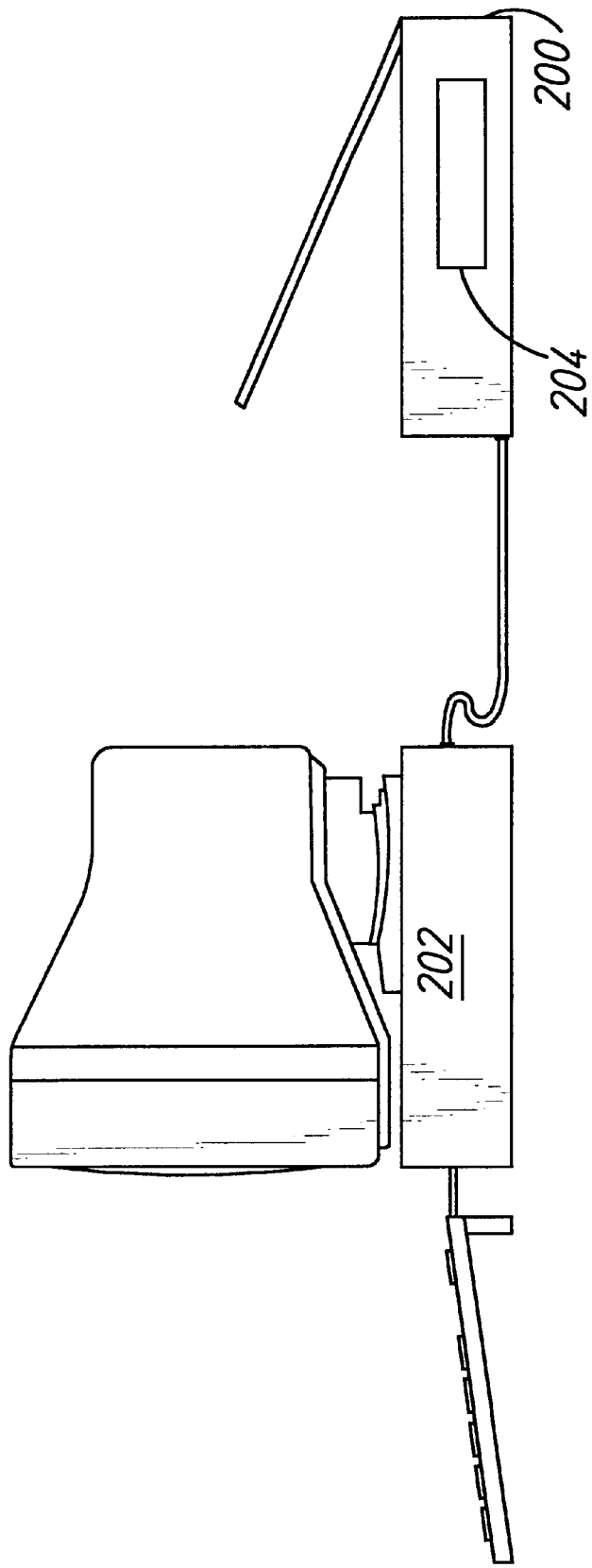
FIG. 2 is a block diagram of an imaging system.

FIG. 2 illustrates an imaging system. An imaging device 200 is connected to a host computer 202. The imaging device 200 includes a controller 204 with special hardware for rapidly computing convolution operations as illustrated above. If the imaging device 200 has a two-dimensional photosensor array, for example a digital camera, the effective resolution in both dimensions may be implemented by interpolation or padding followed by decimation. If the imaging device 200 has a one-dimensional photosensor array, the effective resolution in one dimension may be varied by varying the scanning speed. In a specific example embodiment, device 200 is a scanner and the convolution hardware implements a general purpose 9×9 convolution kernel (or smaller) which is expanded by padding to 72×9 as discussed below.

In general, a spatial low pass filter may be optimized for a specific cut-off frequency, expressed as pixels per inch (or mm) or lines per inch (or mm). Therefore, an optimal spatial low pass filter varies with the native resolution and the effective resolution of the imaging device. In addition to native resolution and effective resolution, there are device-specific specifications such as the modulation transfer function that may affect a choice for low-pass filter parameters. In the specific example embodiment, scanners have a native resolution of 300 pixels per inch (12 pixels per mm) as measured on the image being scanned. For a requested resolution in the X dimension that is other than the native resolution, the image is padded with zeros to generate an 8× effective resolution of 2,400 pixels per inch (95 pixels per mm). Then, for a requested X-dimension resolution less than the effective resolution, device 200 selects a low pass filter that will attenuate at least any spatial frequency greater than twice the requested resolution. The appropriate coefficients are placed in the local 9×9 convolution matrix (padded with zeros to form a 72×9 matrix). The filter output is at the requested resolution. That is, decimation is an integral part of the filter computation. Note again that the low-pass filter coefficients are specific to the imaging device 200. These filter coefficients could be selected by software in the host computer 202, but this would require host 202 to know specific hardware specifications for imaging device 200. In order to keep the software in the host computer 202 as general as possible, it is preferable to make the host computer software independent of imaging device specifications. Then, various imaging devices may be used with different internal specifications without requiring changes in the host computer software.

The host computer 202 may also specify certain convolution operations. For example, for binary images such as line drawings, image "sharpening" or high-pass filtering is desirable to provide sharp edges. In general, convolution operations are linear and can be combined. For example, a low-pass filter for decimation may be combined with a high-pass filter for edge sharpening. With specific hardware 204 available in imaging device 200 for convolution computation, it is desirable to use that hardware for a Laplacian operation or other operator specified imaging processing operations. The problem then is to combine a host-selected Laplacian operation with a imaging-device-selected low pass filter. In a first example embodiment, the host 202 uploads the padded convolution matrix from the imaging device 200, applies a host-selected filter to the convolution matrix, and then downloads the resulting matrix back to the imaging device for use on a scanned image. As a specific example, the host 202 uploads a 9×9 matrix of coefficients (padded to 72×9) from imaging device 200, applies a padded Laplacian operator to the 72×9 matrix of coefficients just as if the coefficients were pixel values in the earlier examples above, and then downloads the resulting 72×9 matrix back to the imaging device 200.

When convolving the two kernels, the host-specified kernel coefficients and the device-specified kernel coefficients must be based on the same resolution. Recall that the filter coefficients in the imaging device 200 are based on decimation of an effective resolution (for one dimension only in the case of a scanner). In the specific example implementation discussed above, the effective resolution is eight times higher than the native resolution. This may also be device-specific. Therefore, in addition to the device-specific filter coefficients, the imaging device must also communicate information regarding interpolation (or padding) or decimation. In a specific embodiment in which the kernels are convolved by the host computer, the host also uploads a decimation factor (an integer) that essentially specifies that the host Laplacian kernel coefficients must be "padded" by additional coefficients having a value of zero. For example, assuming that the peripheral imaging device pads by 8×, each pair of host Laplacian kernel coefficients must be separated by 7 coefficients having a value of zero so that the host kernel resolution is the same as the imaging device kernel resolution. For an imaging device having a two-dimensional imaging array, the Laplacian kernel coefficients must be padded in both the X and Y dimensions. For an imaging device having a one-dimensional photosensor array, the Laplacian kernel only needs to be padded in a single dimension. Finally, note that in general, X and Y resolutions may be different. Therefore, in general, the imaging device may have to send two decimation factors, one for X resolution and one for Y resolution.

As an alternative embodiment, the host may download the host-specified Laplacian kernel to the peripheral imaging device and the imaging device may then convolve the two kernels. Recall that the host also specifies resolution, so no separate information is required by the imaging device to determine how to pad the Laplacian kernel with additional coefficients having a value of zero. Therefore, in the alternative embodiment, the host software can be completely device-independent, whereas in the first embodiment, the imaging device must tell the host some information about effective resolution.

Figure 3:
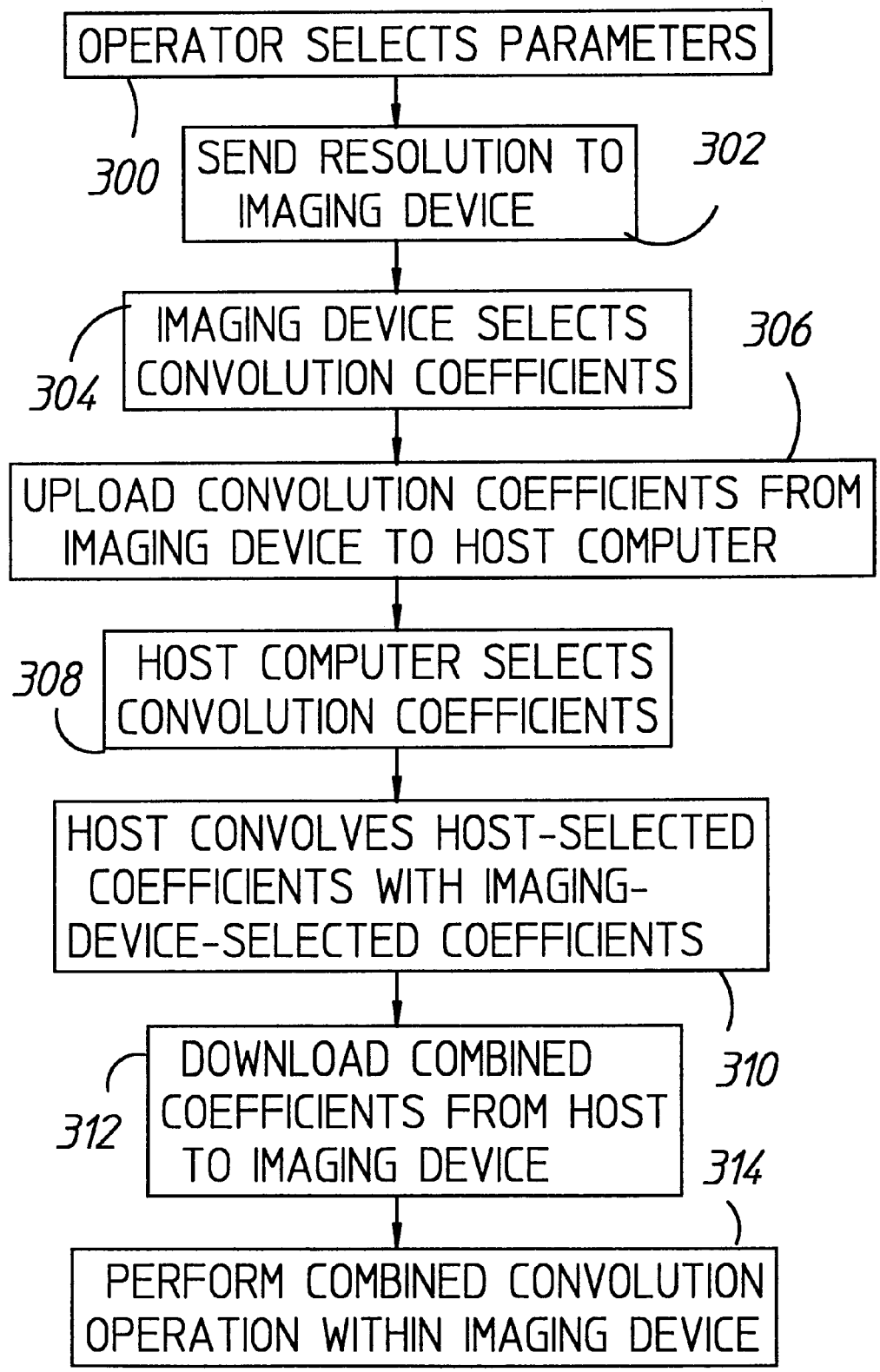
FIG. 3 is a flow chart of a method in accordance with the invention.

FIG. 3 is a flow chart of a method in accordance with the first example embodiment. At step 300, an operator selects various parameters such as resolution and sharpening. Note that resolution and sharpening are just examples, and that there are other convolution operations that may be appropriate for host-selection of coefficients or imaging device selection of coefficients. At step 302, resolution (or other parameters appropriate for image device selection of coefficients) is sent to the imaging device. At step 304, software within the imaging device selects appropriate convolution coefficients based on native and effective resolution of the imaging device. At step 306, the imaging-device-selected coefficients are uploaded to the host computer. At step 308, the host computer selects appropriate convolution coefficients for sharpening or other device independent parameters. At step 310, software in the host computer convolves the host-selected coefficients with the coefficients uploaded from the imaging device. At step 312, the combined coefficients are downloaded to the imaging device. At step 314, software in the imaging device uses special hardware in the imaging device to perform the convolution operation on an image. Again, in an alternative embodiment, at steps 306–310, the host computer may download host-selected coefficients to the imaging device and the imaging device then convolves the two kernels.

Note that the sample filters above are symmetrical about the center row and column. In the specific example embodiment, an odd number of rows and columns is assumed and symmetry about the center row and column is assumed so that only one corner of a convolution matrix is actually stored. That is, for a 3×3 convolution matrix, only a 2×2 matrix needs to be stored, for a 5×5 convolution matrix only a 3×3 matrix needs to be stored and so forth. In the specific first example embodiment, for a 3×3 Laplacian, a boundary of two elements is added to each edge of the uploaded convolution matrix with all coefficients in the boundary having a value of zero. If the Laplacian kernel is greater than 3×3, a larger boundary must be added.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of forming a convolution kernel in an imaging system, the imaging system comprising a host computer and an imaging device that provides an image to the host computer, the method comprising the following steps:

(a) sending an imaging parameter from the host computer to the imaging device;

(b) selecting, by the imaging device, first convolution coefficients based on the imaging parameter from the host computer;

(c) selecting, by the host computer, second convolution coefficients;

(d) convolving the second convolution coefficients with the first convolution coefficients to form third convolution coefficients; and (e) convolving, by the imaging device, the third convolution coefficients with an image.

2. The method of claim 1 where the imaging parameter is resolution.

3. The method of claim 1 where the first convolution coefficients form a kernel for spatial low-pass filtering.

4. The method of claim 1 where the second convolution coefficients form a Laplacian operator.

5. The method of claim 1 further comprising the following step before step (d):

(d1) uploading, by the host computer, from the imaging device, the first convolution coefficients;

and further comprising the following step after step (d):

(d2) downloading, by the host computer, to the imaging device, the third convolution coefficients.

6. The method of claim 1 further comprising the following step before step (d):

(d1) downloading, by the host computer, to the imaging device, the second convolution coefficients.

* * * * *